Jan. 2, 1962  W. M. FITZGERALD  3,015,364
HORTICULTURAL IMPLEMENT

Filed Nov. 2, 1959  4 Sheets-Sheet 1

INVENTOR
WILLIAM MICHAEL FITZGERALD
BY
Larson and Taylor
ATTORNEY

Jan. 2, 1962 W. M. FITZGERALD 3,015,364
HORTICULTURAL IMPLEMENT
Filed Nov. 2, 1959 4 Sheets-Sheet 4

INVENTOR
WILLIAM MICHAEL FITZGERALD
BY
Larson and Taylor
ATTORNEY 3,015,364
HORTICULTURAL IMPLEMENT
William Michael Fitzgerald, White Lodge, Holmwood
Drive, Leicester, England
Filed Nov. 2, 1959, Ser. No. 850,386
Claims priority, application Great Britain Nov. 6, 1958
1 Claim. (Cl. 172—22)

This invention relates to horicultural implements and is particularly concerned with implements of this character which are used to perforate the surface of the ground, for example for conserving the grass-turfed surface of a sports field or green, to result in aeration and drainage of the soil.

This invention, in fact, is concerned with an implement, or an attachment to an existing implement, which can be used for this purpose and in analogous situations and it has primarily been designed for this particular use, the following description will be confined thereto, it being understood that this does not exclude the use of the invention in other situations, or the modifications which might be required to suit it for these other applications, provided they fall within the general spirit of the invention as explained below.

To be effective, holes formed in the ground for such purposes as those referred to above should penetrate to a substantial depth, e.g. as much as 6", and hitherto use has been made for this purpose of implements having tines or spikes which, as the implement is propelled over the ground, are thrust into the soil and quickly withdrawn. Owing to the need to avoid the tearing out of furrows from the ground, when using this procedure, the tines or spikes have been arranged so that they are capable of pivoting relatively to a mounting support during the actual "spiking" operation. However, they are not thereby able to penetrate very deeply and cannot be driven into hard ground without the use of elaborate and cumbersome means.

Another prior method is to force into the ground a set of tools, each in the form of a hollow tube, the earth driven downwards by the leading edge of this tool being forced up through the hollow bore of the latter and out of the tool. The success of this method is found to be very dependent on the quality and moisture condition of the ground. For example it is found to be extremely difficult, if not impossible, to employ it with any effectiveness whereby the ground is hard. Nor is it efficient on ground that is too soft, since there is no extrusion of the soil core.

The aim of the present invention, therefore, is an implement which obtains the required results irrespective of the condition of the ground and without the drawbacks attaching to the known equipments, to which end the invention provides a tool head incorporating one or more depending drill bit holders with means for transmitting a rotary drive to a bit engaged therein, this head further having means for mounting it on a supporting arm of a parent machine or carriage, so that when the drill bit or bits is or are out of contact with the ground, they are automatically self-setting under gravity into a vertical or substantially vertical position irrespective of the particular attitude, at such time, of the supporting arm, and will remain in this position during a drilling operation.

The principle is, therefore, that the implement can be moved to the required site, e.g. from site to site, and the head lowered, with the bit or bits rotating, so that one or more holes will be positively drilled in the ground irrespective of the condition of the latter. It is found that the soil which is bored out as the drill bit penetrates the earth tends to accumulate along the turns of the bit and to be lifted out therewith, for example when the bit or bits is or are removed from the ground by tilting the mounting arm. When next applied to use in a fresh area, the soil still attaching to the bit is scavenged by the corkscrew-like descent of the bit into the new earth and is disposed around the rim of the new hole. Further, the holes so made can be of any depth, within the capacity of the drill bit or bits, and can be controlled at will by the user to suit the particular circumstances in which the implement is being used at the time.

The corkscrew-like action has the further advantage that the descent of the tool takes places primarily under gravity so that no special turning means are required to adjust the rate of drill rotation to the speed of descent, and confers the attribute that the implement can be used with all moisture conditions of the soil, from extremely wet to baked hard-caked soil.

If desired, the head may be provided with ground contact means, e.g. of fixed or adjustable effective height, for automatically determining such depth of penetration, and preventing the underface of the body of the head from picking up and packing down loose soil.

To implement the required self-setting of the bits, irrespective of the attitude of the supporting arm of the parent machine or carriage when the user moves the head into operating position, the tool head will be mounted so that it can swing freely under gravity on its supporting structure, and for this purpose is advantageously equipped with a structure for suspending it symmetrically about a pivotal axis. Thus, for example, the head may comprise a bearing cross piece which is pivoted on said supporting arm, or a member rigid therewith, and which, through suspension means, carries a frame or housing for said bit holder.

In further performance of this arrangement, moreover, the drive may be imparted through a driving pulley which is rotatably mounted on said bearing cross piece and has a depending spindle operatively engaging the drill holder in said frame or housing, said pulley being driven through a belt from a pulley mounted on said supporting arm in uniplanar alignment with said driving pulley and itself driven from a motive power source on the parent machine or carriage.

The means pivotally mounting the head, in this construction, may conveniently comprise a fixed bracket on said supporting arm having a sleeve embracing a shaft journalled on said bearing cross piece, said sleeve being adjustable along this shaft to tension the driving belt between the aforesaid pulleys.

Again, provision is preferably made for quick disposal of the tool head in an upturned swung-back position on the supporting arm, whereby the implement can more conveniently be transported for substantial distances in an out-of-the-way condition. To this end, for example, the crosspiece may have an offset portion embracing the pulley on the supporting arm with a clearance.

Although reference has been made above to the use of one drill bit only, in fact it is preferred to use a plurality of bits in the implement, so that these can cover a relatively large area at one application, and this use of multiple bits will hereinafter be assumed for convenience of further description. In such an arrangement, moreover, these bits will be carried by a single head and be spaced on the latter, so as to form a regularly distributed pattern of holes in the ground.

In implementing this arrangement, the head may thus include spaced holders for a plurality of drill bits, these holders being rotatably mounted in a common housing and being drivable in common through appropriate transmissions in said housing. The common drive can be imparted in various ways, e.g. through toothed gearing, belt and pulley gearing and so on, but preferably one of the bit holders is directly engaged by the said depending spindle and rotates the other holders through a chain and sprocket drive.

In accordance with a further feature of the invention, the bit holders are mounted by press-fitted, bevelled, bearing bushes in upper and lower plates of said housing, and a lubricating cup is associated with each holder in the upper plate. This feature, which will be described in more detail below in reference to a specific embodiment of the invention, allows for effective lubrication of the rotating tools in that lubricant can, in use, flow down between said bearing bushes and said holders, and over the outer surface of these holders.

Thus the head may be effectively incorporated in a hand propelled cultivating machine comprising a framework which is equipped with a pair of ground wheels and supports an internal combustion engine driving a forwardly-projecting shaft supported, and rotating, in a sleeve which is fixed in the framework. At its leading end, this sleeve carries a gear box including a worm connected to the said shaft and a worm wheel for transmitting the engine drive to the working tool or tools.

Although the present invention resides in a complete implement with a head of the form set forth, it also covers a head per se for fitting to an implement, for example primarily designed for other purposes.

One form of tool head conforming with the present invention is illustrated by way of example in the accompanying drawings, in which.

Figure 1:
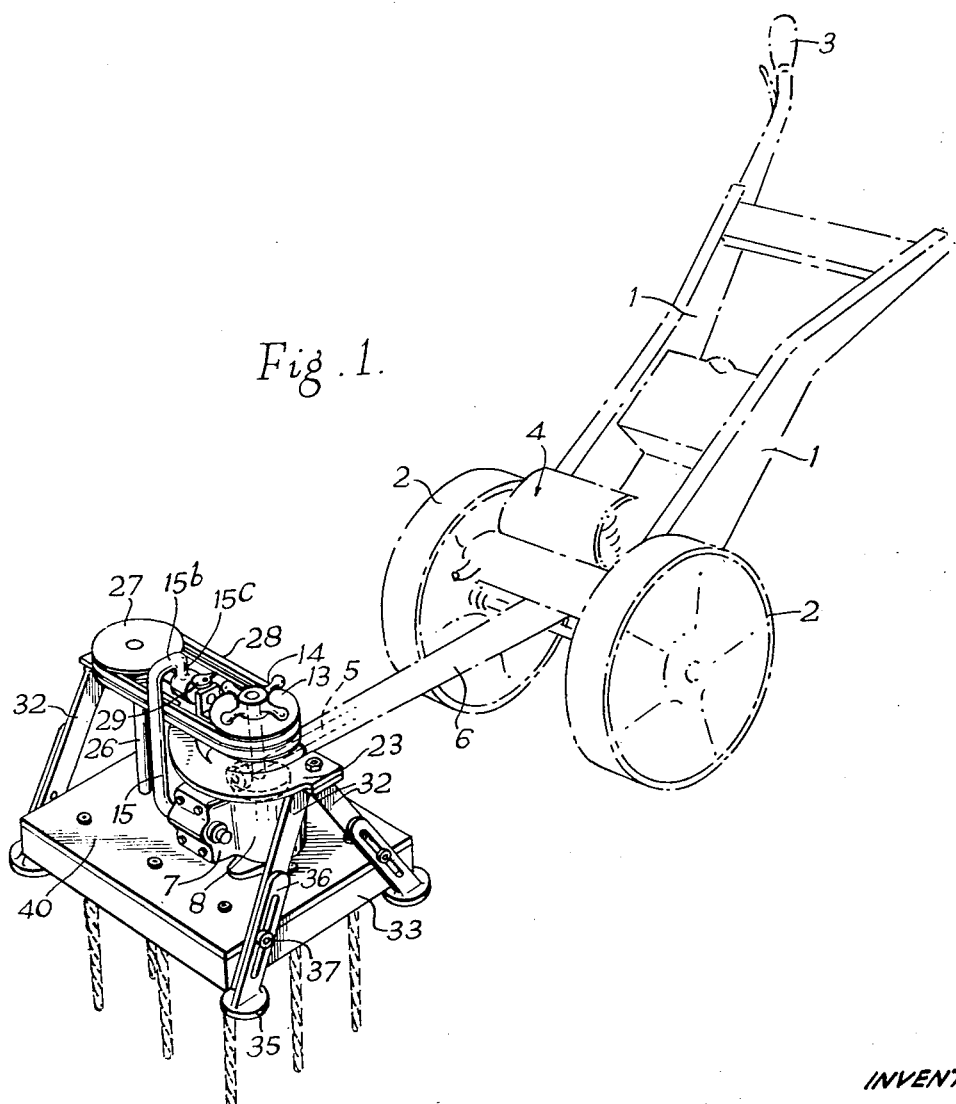
FIGURE 1 is a perspective illustration of the head shown carried by a form of parent cultivating machine, with a plurality of drills entering the ground in a drilling operation.
Figure 2:
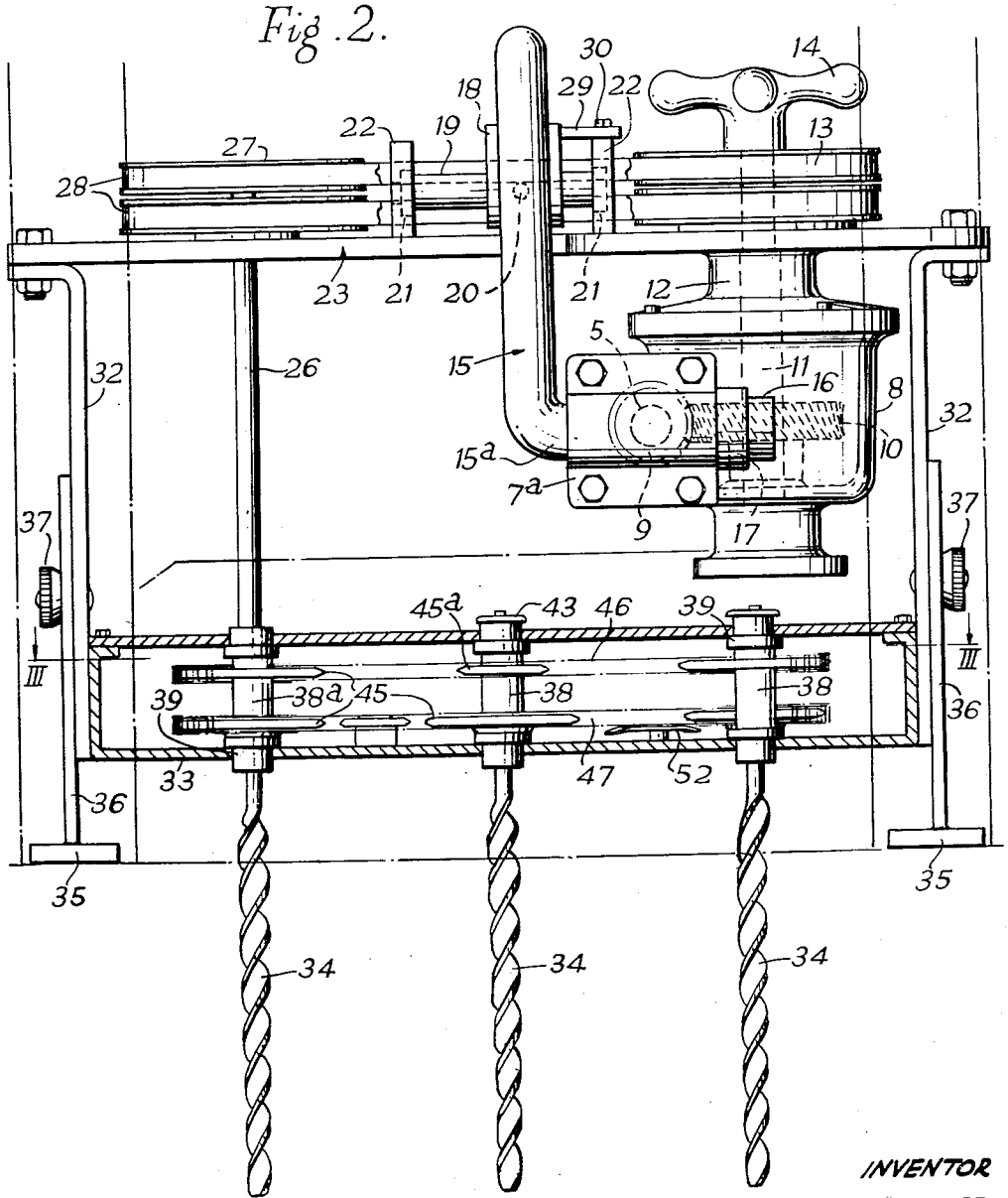
FIGURE 2 is a front view of the tool head, with the housing for the bit holders and the drive transmission therefor shown in cross section on the line II—II of FIGURE 3.

The tool head illustrated in the drawings, is shown in FIGURE 1 as carried by an appropriate form of cultivating implement, here seen as comprising a pair of side frame members 1 mounted on ground wheels 2 and provided with propelling handles 3. This machine, which is not shown in detail, since it, per se, comprises no part of the present invention, supports a motor, generally designated 4, which rotates a drive shaft 5 journalled in a forwardly projecting supporting arm 6 of the machine.

At its leading end the shaft has secured thereto a box 7 forming a lateral extension of a gear casing 8, and a worm wheel 9 coupled to the end of the shaft 5 meshes with a worm wheel 10 in this casing and thereby transmits a drive to an upstanding shaft 11 mounted in rotatable bearings (not shown) in the casing.

At its upper side the casing 8 is provided with a screw-on boss 12 which rotatably supports a double pulley 13 which is keyed centrally on the shaft 11. A nut 14 can be tightened down on the upper side of the pulley 13 so as to hold it in firm engagement with the shaft 11, or can alternatively be unscrewed to allow for replacement of this pulley.

Clamped and held against rotation in the box 7 by the removable front plate 7a of the latter is the cranked end 15a of a supporting bracket 15 of rod form, this end being further clamped against longitudinal movement by a nut 16 engaging a boss 17 on the box. As will be observed, the bracket 15 is again turned through right angles to form an upper section 15b and this is turned down at its outer end 15c and there has a depending integral sleeve 18 through the bore of which is fitted a shaft 19 to which the sleeve 18 is pinned by a set screw 20.

The shaft 19 is rotatable in bearings 21 in each of two spaced lugs 22 mounted on a bearing cross piece 23 by which the remainder of the tool head, including the rotating drill bits and the drive transmission means therefor (to be described below) are supported. It will therefore be appreciated that these operative parts can be adjusted laterally with respect to the parent machine, as and when required, again as will be referred to below. It will also be seen from this that the sole support of this operative part of the head is obtained through the shaft 19 which is, in effect, rigid with the supporting arm 6 of the parent machine, and bearings 21 in lugs 22 allow the operative part of the tool head to be swung relatively to this supporting arm and the parent machine.

Figure 5:
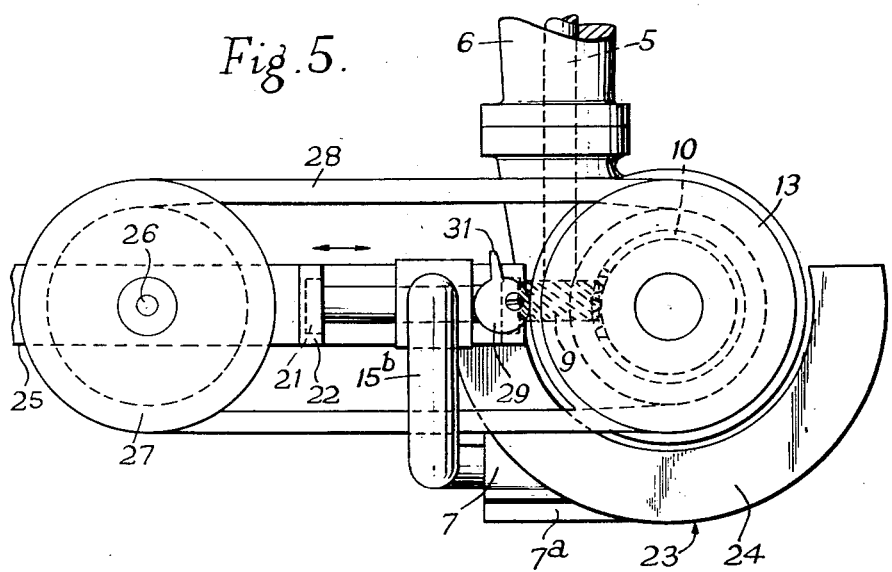
FIGURE 5 is a partial plan view of the upper part of the tool head illustrated in the preceding figures.

As will be seen particularly from FIGURE 5, the cross piece 23 comprises an arcuate portion 24 and a rectilinear portion 25 which are arranged with this arcuate portion by-passing the pulley 13 with a clearance, thus allowing for relative rocking movement between the cross piece and the pulley, i.e. in performance of the relative pivoting movement referred to above.

Rotatably mounted in the rectilinear portion 25 of the cross piece is a drill-driving spindle 26 which, at its upper end and above the cross piece 23, has secured thereto a second double-grooved pulley 27 which is operable from the pulley 13 through V-belts drive 28. By this means the drive from the motor 4 on the parent machine is transmitted to the shaft 26 with a reduction determined by the worm and worm wheel gearing 9, 10. The advantage of the use of a belt drive of this nature will be appreciated, having regard to the fact that it allows for the relative twisting of the pulleys 13 and 27 when the appliance is in use. Further, it is to be noted that a cam 29 is mounted at the upper side of the right hand lug 22 of the cross piece, and bears with its edge against the sleeve 18 so that, by loosening a screw 30 and turning the cam in appropriate direction by a finger piece 31 thereof (the set screw 20 having been loosened) the sleeve 18 can be shifted along the shaft 19 for the purpose of taking up any slack developing in the belting 28, whereafter the screws 20 and 30 are re-tightened.

At each of its ends, the cross piece 23 has bolted thereto a pair of depending splayed suspension links 32 which, in effect, form a cradle to which is secured the box like housing 33 for the drill bit holders and the transmission means for rotating the various drill bits. These bits, which are indicated at 34 in the drawings, are uniformly tapered from the top shoulder to the tip to facilitate withdrawal from the ground. They depend from the underside of the box like housing 33 and therefore swing with the latter with the cradle formed by the links 32 and the cross piece 23, so that they are automatically self setting under gravity into a vertical position when the bits are raised clear of the ground. When, however, they are allowed to penetrate the ground, on rotation from the spindle 26 through the transmission means to be described below, they enter the ground, descending primarily under gravity, in this vertical status and the depth of penetration thereof can be set, as required, by ground contacting feet 35, on slotted links 36, each of which is associated with one of the links 32 so as to form an extension thereof which is adjustable in effective length by means of a set screw 37.

Figure 4:
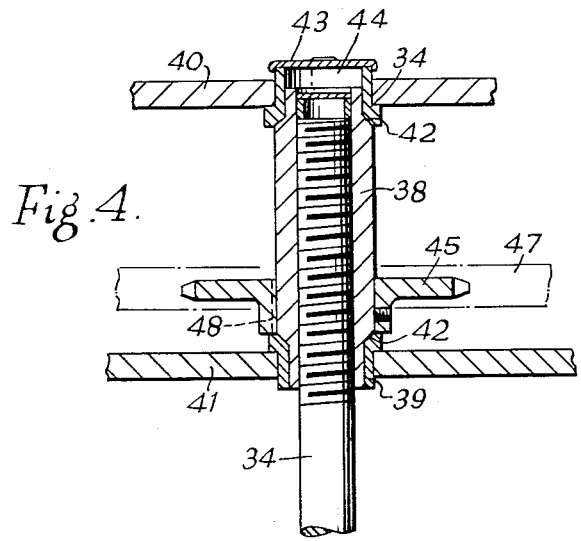
FIGURE 4 is an enlarged cross sectional detail illustrating the mounting of one of the tool bit holders in the housing, this detail being a cross section on IV—IV of FIGURE 3

In the drawings the drill bits 34 are each removably screwed into an individual bit holder 38 in the housing 33. Referring more particularly to FIGURE 4, each of these bit holders is received at its upper and lower ends in press fitted bearing bushes 39 in the upper and lower plates, 40 and 41 respectively, of the housing 33. It will be observed that these bushes 39 are provided with inner bevelled shoulders 42 engaging with correspondingly-bevelled shoulders of the holder 38, and that a press cap 43 is snapped on the upper bushes 39 and defines a small oil reservoir 44 above the upper end of the associated bit holder 38. Hence, as the holder 38 rotates with its associated bit during a drilling operation, oil will percolate down between the upper bush 39 and the reduced upper end of the holder 38, down along the sides of the latter and back between the contacting tapered shoulders around the lower bush 39, and down the shank of the bit thus providing lubrication of these rotating parts and protecting the parts against rust. Some of the oil also spreads over the rotary drive-transmitting sprockets and thereby also lubricates the driving chains (see below).

Figure 3:
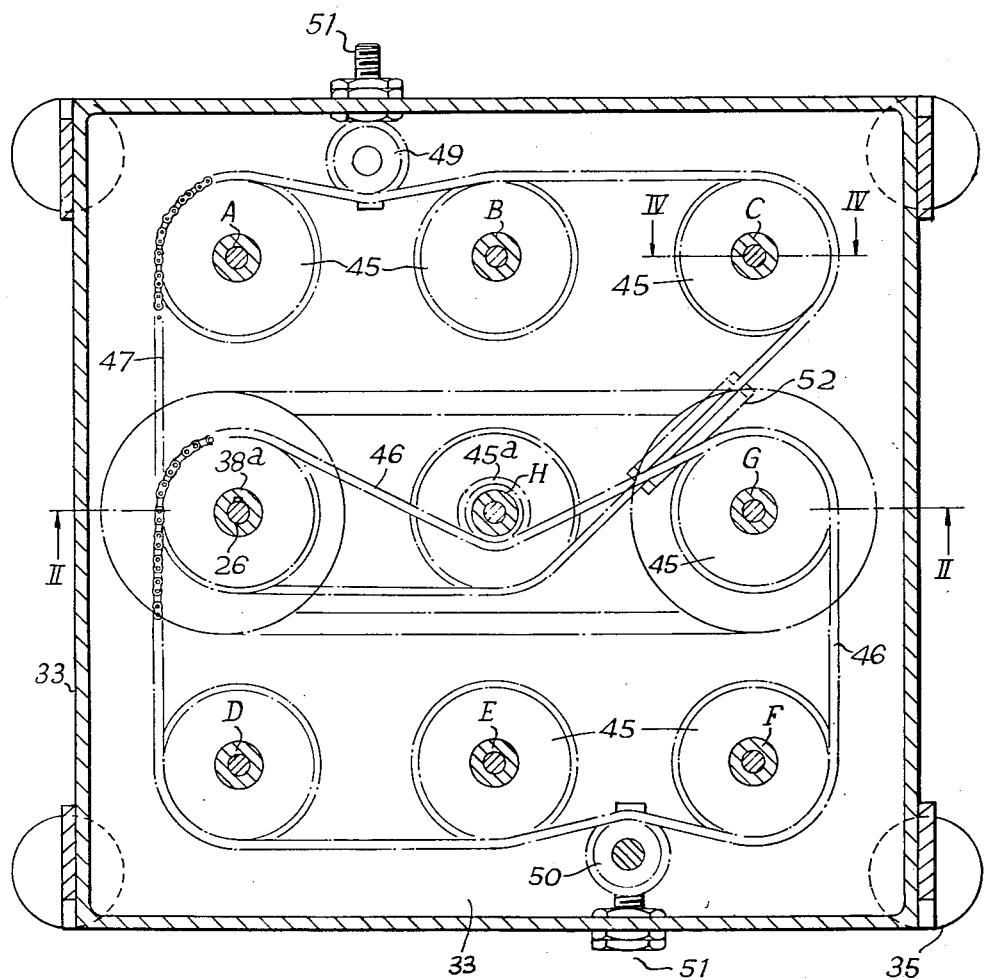
FIGURE 3 is a horizontal cross section through this housing, as seen on the line III—III of FIGURE 2.

The requisite rotary drive is transmitted from the spindle 26 which is in splined engagement with the holder 38a positioned therebeneath. This holder 38 has a pair of spaced sprocket wheels 45 secured thereto by grub screws, and these have upper and lower chains 46 and 47 respectively passing therearound. The housing 33 has provision for the mounting of some nine regularly distributed bits 34, and holders 38, and FIGURE 3 illustrates the particular arrangement adapted for rotating all these in the same direction from the common holder 38a. As will be seen from this figure, the holders 38 at the positions indicated A, B and C have a sprocket 45 at the lower position, the holder D, E, F and G sprockets at the upper position, and the holder at H a standard size sprocket 45 at the lower position and a smaller idler sprocket 45a rotatable on its holder 38 at the upper position. In all cases the sprockets are preferably provided with one or more channels, such as is indicated at 48 in FIGURE 4, for the passage of lubricant from the upper to the lower end of the holder 38, as described above.

In addition the box includes idler sprockets 49 and 50 to maintain the tension of the respective chains, these being mounted on threaded rods 51 adjustably bolted in the side wall of the housing. In addition a chain support 52 in the form of a metal strip upstanding from the bottom plate 41 of the housing may be used to support the lower chain 47 against sagging.

As will therefore be appreciated, the machine carrying the tool head will be moved from area to area for the required drilling operations to be performed each time, the machine being propelled with the handles lowered so that the drill bits are just clear of the ground. At each drilling operation, the handles of the machine are raised the small amount required to lower the drill bits into contact with the ground, which they will meet in a self-adjusted vertical status, and the further lowering allows them to penetrate vertically into the ground, the parent machine being eased back as the penetration proceeds. During this drilling there will be a small amount of relative twisting between the pulleys 13 and 27, and the belts 28 readily allow for this.

When it is required for any reason to move the machine to a new working area, or to transport it from or bring it to such an area, the whole of the tool head can be swung forwards and upwards to an out-of-the-way position. When this is to be done, the motor is stopped, the belts 28 loosened by movement of the cam 29 and then taken off the pulleys, whereafter the cross piece 23, from which the drill bits and the drive transmitting means depend, can be swung forwards and over into the out-of-the-way position. This is allowed for by the provision of the arcuate portion 24 of the cross piece which is able to clear the pulley 13 in this movement, and by the fact that the straight portion 25 of the cross piece can turn within the cranked portion 15b of the bracket 15.

What I claim then is:

A horticultural implement comprising a vehicle, a supporting arm attached to and extending forwards from said vehicle, a motor mounted on said vehicle, a power reduction gear box rigidly mounted to the leading edge of said supporting arm, a first pulley rotatable with respect to said gear box and power transmission means in said gear box and in said supporting arm for transmitting power from said motor to said first pulley, a cradle mounted by connecting means to said gear box for rotation of said cradle between upper and lower positions on a horizontal axis transverse to said supporting arm, a housing attached rigidly connected to said cradle for rotation therewith about said axis, at least one rotatable earth tiller rotatably mounted in said housing to be in working position when said cradle is rotated to its lower position, second power transmission means carried by said housing for driving said rotatable earth tiller including a second pulley in said second power transmission means disposed for alignment with said first pulley to accommodate a driving belt between said first and second pulleys when the cradle is in its lower position.

References Cited in the file of this patent

UNITED STATES PATENTS

| 1,773,672 | Grim | Aug. 19, 1930 |
| 2,200,921 | Granell | May 14, 1940 |
| 2,394,771 | Hill | Feb. 12, 1946 |
| 2,634,770 | Mall | Apr. 14, 1953 |
| 2,918,130 | Thom | Dec. 22, 1959 |

FOREIGN PATENTS

| 151,346 | Australia | May 11, 1953 |
| 441,416 | Great Britain | Jan. 20, 1936 |